United States Patent
Subramani et al.

(10) Patent No.: US 9,553,868 B2
(45) Date of Patent: *Jan. 24, 2017

(54) TOGGLE BETWEEN ACCOUNTS

(71) Applicant: Dropbox, Inc., San Francisco, CA (US)

(72) Inventors: Anand Subramani, San Francisco, CA (US); Francois Alexander Allain, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/716,759

(22) Filed: May 19, 2015

(65) Prior Publication Data

US 2015/0256533 A1 Sep. 10, 2015

Related U.S. Application Data

(63) Continuation of application No. 13/886,222, filed on May 2, 2013, now Pat. No. 9,065,818.

(51) Int. Cl.
*G06F 21/45* (2013.01)
*H04L 29/06* (2006.01)

(52) U.S. Cl.
CPC .......... *H04L 63/0815* (2013.01); *G06F 21/45* (2013.01); *H04L 63/104* (2013.01); *H04L 63/20* (2013.01)

(58) Field of Classification Search
None
See application file for complete search history.

(56) References Cited

U.S. PATENT DOCUMENTS

| | | |
|---|---|---|
| 6,092,199 A | 7/2000 | Dutchet et al. |
| 7,480,718 B2 | 1/2009 | Marcus et al. |
| 2003/0115205 A1 | 6/2003 | French et al. |
| 2004/0128546 A1 | 7/2004 | Blakley et al. |
| 2004/0205176 A1 | 10/2004 | Ting et al. |
| 2010/0057845 A1 | 3/2010 | Thomas et al. |

OTHER PUBLICATIONS

U.S. Appl. No. 13/886,222, filed May 2, 2013, Office Action, Oct. 15, 2014.
U.S. Appl. No. 13/886,222, filed May 2, 2013, Notice of Allowance, Apr. 10, 2015.
U.S. Appl. No. 13/886,222, filed May 2, 2013, Notice of Allowance, Mar. 17, 2015.
U.S. Appl. No. 13/886,222, filed May 2, 2013, Interview Summary, Dec. 30, 2014.
Fast Account Switching, Flickr—Photo Sharing!, www.flickr.com/photos/factoryjoe/4425505964, obtained from the internet on Jan. 28, 2014, 2 pages.

*Primary Examiner* — David Le
(74) *Attorney, Agent, or Firm* — Hickman Palermo Becker Bingham LLP

(57) ABSTRACT

Techniques are described for enabling administrators of teams that use a particular service to specify which sign-on options, of multiple possible sign-on options, are assigned to the members of the teams to which the administrators belong. For example, an administrator may assign a first sign-on option, which only allows users to use native authentication, to one set of members of the team. At the same time, the administrator may assign a second sign-on option, which only allows users to use third-party single-sign-on authentication, to another set of members of the same team.

20 Claims, 5 Drawing Sheets

TOGGLE BETWEEN ACCOUNTS

BENEFIT CLAIM

This application claims the benefit under 35 USC §120 as a continuation of application Ser. No. 13/886,222, filed May 2, 2013, the entire contents of which is hereby incorporated by reference for all purposes as if fully set forth herein. The applicant(s) hereby rescind any disclaimer of claim scope in the parent application(s) or the prosecution history thereof and advise the USPTO that the claims in this application may be broader than any claim in the parent application(s).

FIELD OF THE INVENTION

The present invention relates to services that support both third-party single-sign-on authentication and native authentication.

BACKGROUND

For many online services, users are required to first establish an account with the provider of the services. Depending on the service, the account may be paid or free. After a user establishes an account with a service, the service must verify that the user is associated with the account each time the user establishes a session with the service. The process of verifying that a user is associated with an authorized account is referred to as "user authentication".

One common way for a service to authenticate a user is to require that the user provide a username/password combination at the time the account is created. In future sessions, the user provides the username/password combination to the service at the beginning of each session to verify that the user has the account. The term "native authentication" is used herein to refer to a service that authenticates users without involving third-party authentication services.

Many users have accounts with multiple online services, each of which may require a username/password. In order to remember their passwords, users may write them down, use the same password for all services, or pick easy-to-guess passwords. Unfortunately, all of these practices compromise the security the use of passwords is intended to promote.

To address the difficulty of remembering distinct, hard-to-guess passwords for multiple services, some services have been developed whose purpose is to assist with the authentication of other services. Such services, are referred to herein as "single-sign-on providers". In general, single-sign-on allows a user to log in once, and thereby gain access to multiple services without being prompted to log in again to each of them.

Various approaches have been taken to provide single-sign-on functionality. Such approaches include Kerberos based single-sign-on, smart card based single-sign-on, Integrated Windows Authentication, and Security Assertion Markup Language (SAML), which is an XML-based solution for exchanging user security information between an enterprise and a service provider. These are merely examples of single-sign-on approaches, and the techniques described herein are not limited to any particular approach for single-sign-on.

Though single-sign-on providers are generally available, it is common for many users of a service to use the native authentication of the service, rather than a single-sign-on provider. For example, a user or company that uses few services may not think the cost of using a single-sign-on provider is justified. Therefore, many services need to have support for both native authentication and single-sign-on authentication. In systems that support both native authentication and single-sign-on authentication, it is important to provide tools that assist administrators in the management of the authentication options.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
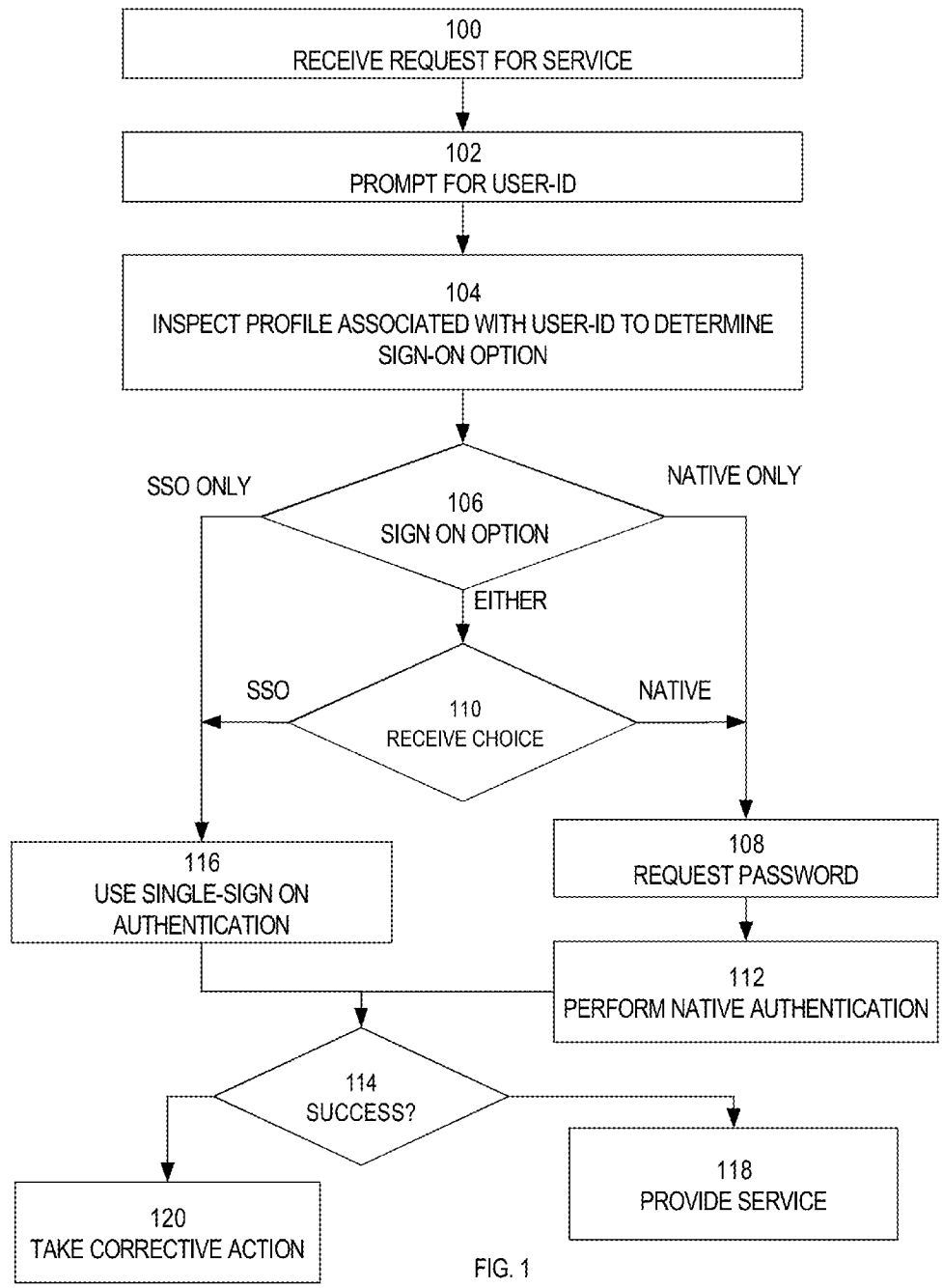
FIG. 1 is a flowchart illustrating steps performed by a service that supports both third-party single-sign-on authentication and native authentication.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for enabling administrators of teams that use a particular service to specify which sign-on options, of multiple possible sign-on options, are assigned to the members of the teams to which the administrators belong. For example, an administrator may assign a first sign-on option, which only allows users to use native authentication, to one set of members of the team. At the same time, the administrator may assign a second sign-on option, which only allows users to use third-party single-sign-on authentication, to another set of members of the same team. A third sign-on option may allow users to use either native authentication or third-party single-sign-on authentication. Techniques are also provided to make the sign-on assignments based on each member's role, and to test single-sign on with the service using a tool provided by the service provider.

Teams

Within many services, users are grouped into user groups. Such user groups are referred to herein as "teams". Single teams may, for example, include all users the service that belong to a particular company. On the other hand, users from a single company may be divided into multiple teams. Typically, each team will have one or more members that have been designated to be "administrators" for the team. Services often make available to administrators tools that are not made available to other members of the team. According to embodiments that shall be described hereafter, those administrator tools may include tools that relate to how members of the team log on to the service.

Sign-Options

According to one embodiment, a service makes available to team administrators a tool that allows the administrators to specify how members of their team are permitted to authenticate. For example, in one embodiment, the administrator can specify any one of:
- only accept native authentication
- only accept single-sign-on authentication
- accept either single-sign-on or native authentication In one embodiment, administrators may manually specify the sign-on option for each member of the team. For example, assume that a team includes members A-E. An administrator may specify that members A, B, and C must use native authentication, member D must user single-sign-on authentication, and member E can use either.

Alternatively, each user may be associated with a specific role, and the sign-on options may be assigned on a role-by-role basis. For example, members A, B and C may have the role "in-company team member", member D may have the role "outside consultant", and member E may be the "administrator". Based on this role assignment, the administrator may assign the "single-sign-on only" option to "in-company team members", the "native only" option to "outside consultants", and the "either/or" option to "administrators".

Referring to FIG. 1, it is a flowchart illustrating steps performed by a service that supports both third-party single-sign-on authentication and native authentication, according to one embodiment. At step 100, the service receives a request for service from a particular user. At step 102, the service asks the user for a user-id (assuming that the user-id was not provided in the initial request).

At step 104, the service locates the profile associated with the user-id provided by the user. From the profile, the service determines the sign-on option specified for the user. As mentioned above, the sign-on option for a user may have been directly selected by the administrator of the team to which the user belongs, or may have been assigned to a role by the administrator. In the case where the sign-on option is assigned to a role, step 104 may involve determining the role associated with the user, and then determining the sign-on option that the administrator assigned to that role.

At step 106, control branches based on the sign-on option of the user. In the case of native-only, control passes to step 108 and the service requests the user's password (if not already provided). At step 112, the service uses its native authentication system to perform authentication based on the provided username/password combination.

In the case of single-sign-on (SSO) only, control passes to step 116 and a third party single-sign-on provider is used to authenticate the user. In the case where the user has the option of using either SSO or native authentication, at step 110 the user specifies which mechanism to use, and control proceeds accordingly to either step 116 or step 108. At step 100, the user may specify which mechanism to use in a variety of ways. For example, in one embodiment, the user may explicitly choose one or the other sign-on mechanism. For example, the user may be presented with controls that allow the user to pick either SSO or native authentication. Alternatively, the choice may be made implicitly through the user's actions. For example, if a user does not enter a password on the service's native authentication sign-on page, then the service assumes the user is to be authenticated via SSO. On the other hand, if the user enters a password through the service's own native sign-on page, then the user is authenticated via native authentication.

Regardless of how authentication is performed, at step 114 the service determines whether authentication is successful. If authentication is successful, then at step 118 the requested service is provided. Otherwise, at step 120 corrective action is taken. The corrective action may be, for example, for the user to try to authenticate again and/or to notify the team administrator about a failed attempt to sign-on to the particular user's account.

Dual Sign-On for Administrators

According to one embodiment, at least one administrator of each team of users always has the option of signing on either user single-sign-on or by using native authentication. Enabling an administrator to sign on either way allows the user to experience the convenience of single-sign-on under normal conditions, and to still be able to sign on to the administrator account in situations where the single-sign-on is not working. For example, if a single-sign-on provider goes down, the administrator may sign on using a service's native authentication. Once signed-on, the administrator is able to change the sign-on option of the other users of the team to either "native-only" or "either". In either case, after the changes made by the administrator, the other users of the team would also be able to sign-on to their accounts with the service even while the single-sign-on provider is down.

Test Mode

According to one embodiment, the administrative tools made available by the service include a tool that allows the administrator to enter a "test mode". The test mode is a mode that allows the administrator to determine that single-sign-on is working, before actually switching all members of the team to the single-sign-on option. According to one embodiment, while in test mode, all members of the team may sign-on either sign on using single-sign on, or sign-on using the native authentication.

When in a mode that allows either sign-on option, a user of the service can navigate to either a single-sign-on page provided by the service, or to a different page provided by the service for native authentication. If a user signs in through the single-sign-on page, the third-party single-sign-on provider is used to authenticate the user. Under those circumstances, the user is able to access the service only after the third-party single-sign-on provider verifies the authenticity of the user. On the other hand, if a user signs in through the native authentication page, the user is able to access the service only after the service's native authentication has verified the authenticity of the user.

It should be noted that the authentication technique used by the single-sign-on provider may be the same as or fundamentally different from the authentication technique used by the service provider. For example, the service provider's native authentication may simply check for a valid user-id/password combination. On the other hand, the single-sign-on provider may make use of any one of numerous possible authentication protocols, including but not limited to Kerberos, CRAM-MD5, etc. One list of authentication protocols is available at en.wikipedia.org/wiki/Authentication_protocol. However, the techniques described herein are not limited to the use of any particular authentication protocols, either by the third-party single-sign-on provider or by the service provider.

If, after some or all of the members of a team have successfully signed in using single-sign-on while in the test mode, the administrator of the team may conclude that single-sign-on has been configured correctly and then switch some or all of the members of the team to single-sign-on only mode. On the other hand, if members are having difficulty signing on using single-sign-on while in test mode, then the members can still use the service until the single-sign-on configuration is fixed by switching to native authentication.

Testing Tool

Instead of or in addition to supporting a testing mode, the service may provide administrators with a testing tool for testing the configuration of single-sign-on with the service. The administrator for a team may use the tool to verify the configuration before switching some or all of the members of the team to single-sign-on only.

According to one embodiment, the service presents the administrator an interface through which the administrator may specify (a) the URL for log-in at the third-party single-sign-on service, and (b) a security certificate used by the third-party single-sign-on to authenticate the administrator. Such an interface is illustrated, for example, in FIG. 2.

Figure 2:
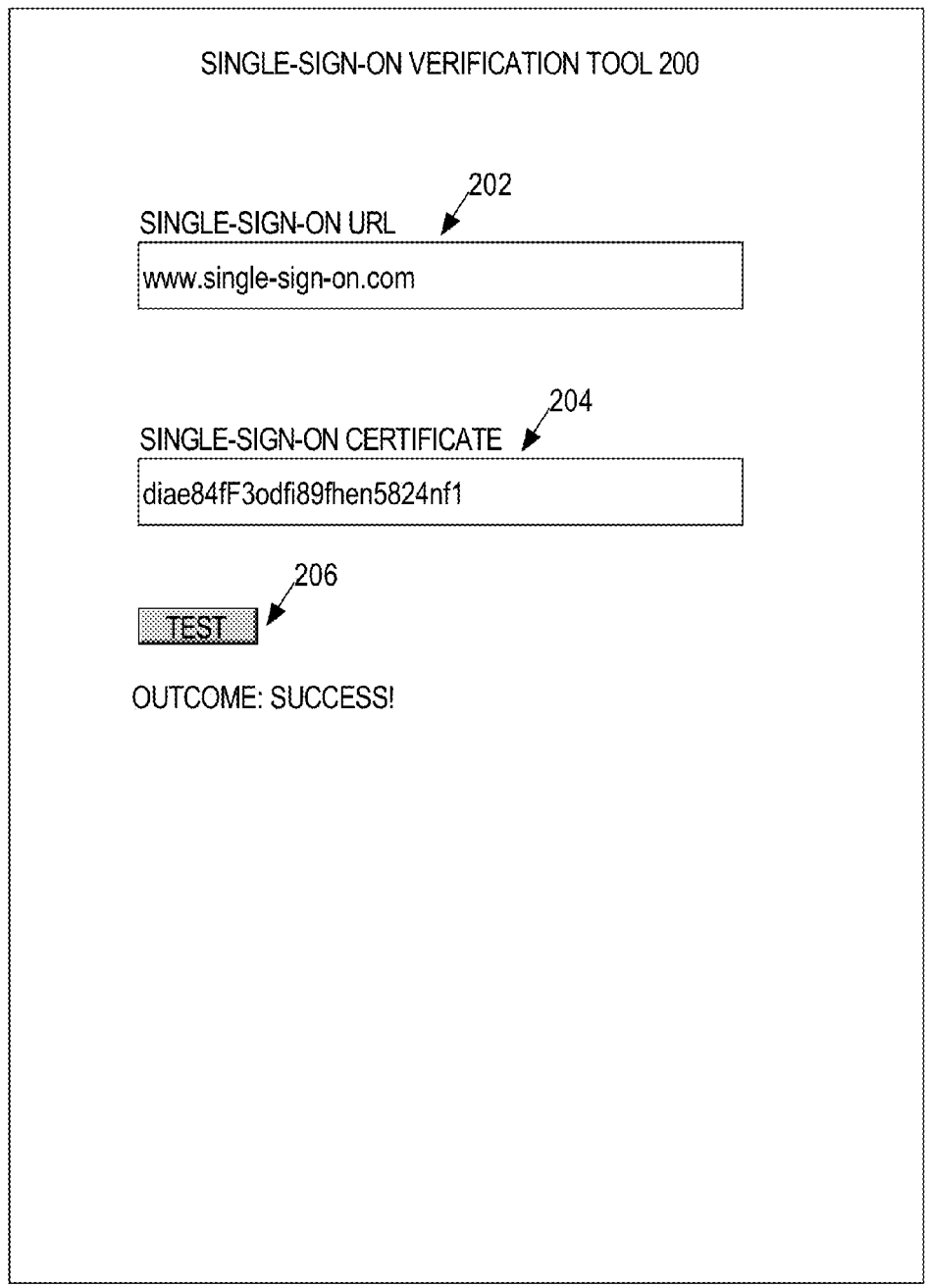
FIG. 2 is a block diagram that illustrates an interface for a single-sign-on verification tool, according to an embodiment.

Referring to FIG. 2, it illustrates an interface for a single-sign-on verification tool 200. The interface may be, for example, a web page generated by the service, or a dialog box of an application provided by the service. In the illustrated embodiment, the interface includes one control 202 through which the administrator may specify the URL for the log-in at the third-party single-sign-on service, and a second control 204 through which the administrator may specify an authentication certificate, previously obtained from the third-party single-sign-on provider.

The interface also includes a test button 206 which, when activated, causes the service to attempt to authenticate the user through the single-sign-on service. Specifically, according to one embodiment, in response to activating button 206, the tool 200 automatically opens a new window and requests the log-in page specified in control 202. That page loads in the new window. As the log-in page, that page will typically include controls that enable the user to log-in to the single-sign-on provider. For example, the page may ask the user to enter the user's user-id and password. If the user-id/password combination are valid, the single-sign-on provider sends a message to the service provider to indicate that the user has been successfully authenticated. In case where the single-sign-on provider uses SAML, the message will typically be a SAML assertion.

In response to the service provider receiving a response from the single-sign-on provider, the verification tool 200 may cause the interface to display the outcome of the test. For example, upon receipt of a SAML assertion that verifies the authenticity of the user, the interface may indicate "success", as illustrated in FIG. 2.

In the context of a single-sign-on provider that uses SAML, the single-sign-on provider will have previously provided the team administrator with a public/private key combination. The single-sign-on certificate 204 is the public key previously obtained from the service provider. The public key is provided back to the service provider when authentication is requested. The SAML assertion provided by the single-sign-on provider is signed using the corresponding private key. Upon receiving the SAML assertion, the service provider verifies that the assertion is signed by the correct private key in order to ensure that the assertion came from the single-sign-on provider.

Figure 3:
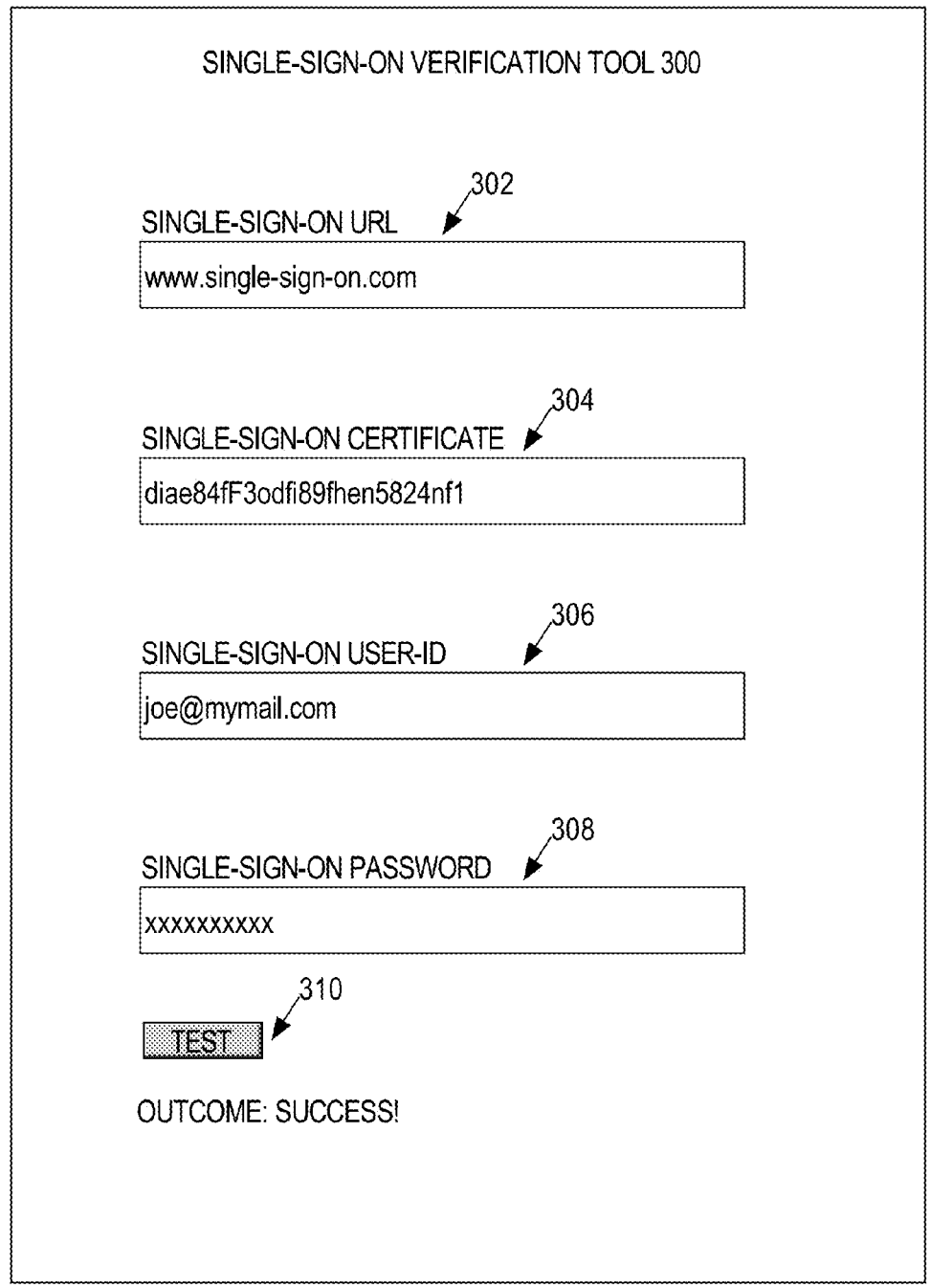
FIG. 3 is a block diagram of a tool for testing whether a system is correctly configured to enable a third-party single-sign-on provider to be used to authenticate users of a service, according to an embodiment.

Referring to FIG. 3, it is a block diagram of an alternative tool 300 for testing the configuration of a service to ensure that a third-party single-sign-on provider may be used to sign users into the service. Tool 300 is similar to tool 200 in that the interface of tool 300 includes controls 302 and 304 that respectively allow an administrator to specify the log-in page and public certificate for the single-sign-on provider. However, tool 300 further includes controls 306 and 308 that respectively allow the administrator to enter the information that the single-sign-on provider requires to authenticate a user. In the present example, the information includes a user-id (specified in control 306) and a password (specified in control 308).

After all of the appropriate information has been provided, the administrator may select the test button 310 to cause the certificate, user-id and password to be sent to the address specified in control 302. Based on this information, the single-sign-on provider sends back an assertion, signed with the appropriate private key, to the service provider. The interface then displays an indication of whether the single-sign-on provider authenticated the user. Because all of the information required to verify the user with the single-sign-on provider is provided through the interface of tool 300, the sign-on page of the single-sign-on provider need not be displayed to the user. Rather, the entire authentication operation may be performed without the user ever navigating away from the interface provided by tool 300.

The administrator for a team may use tool 300 to verify the administrator's own ability to authenticate at the service using the single-sign-on provider. In addition, if the administrator has access to the single-sign-on passwords of the other members of the team, the administrator may also test the single-sign-on for each of the other members. Alternatively, tool 300 may provide a mechanism by which the administrator sends all team members, or selected team members, a request for them to enter their own single-sign-on passwords to test whether they are able to log into the service using the single-sign-on provider.

In response to verifying that single-sign-on works for a particular member of the team, the administrator may switch that member from "native only" or "test mode" to "single-sign-on only". Alternatively, tool 300 may automatically cause a user to switch to "single-sign-on only" in response to a successful test.

Example Interface

Figure 4:
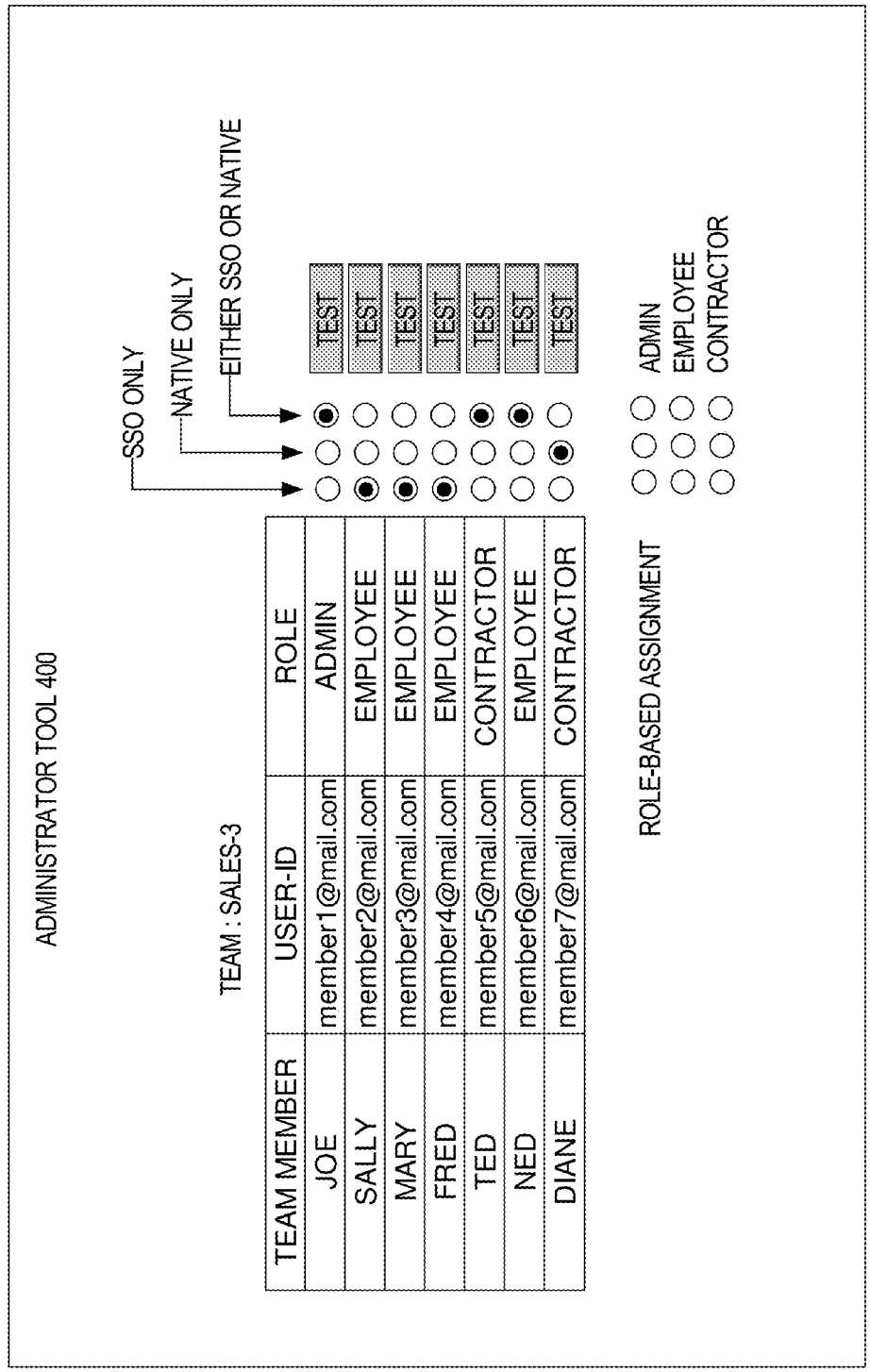
FIG. 4 is a block diagram illustrating an administrator tool for assigning sign-on options to members of a team, according to an embodiment.

Referring to FIG. 4, it is a block diagram illustrating an administrator tool 400 provided by a service, according to one embodiment. The interface of tool 400 may be generated from a web page rendered in a browser, or may be from an installed application provided to the administrator by the service.

In the illustrated embodiment, tool 400 allows the administrator to select the sign-on mode for each member individually, or to automatically make the assignments based on the roles of the members. In the illustrated example, the administrator for the team entitled "SALES-3" has opted to make the assignments individually. Specifically, Joe (the administrator), Ted and Ned have been assigned "either SSO or native". Because the administrator is assigned "either", the administrator will be able to sign-on and change the other team members' settings in case either the SSO or the native authentication encounters trouble.

In the present example, Ted and Ned may have been assigned "either" for a variety of reasons. For example, Ted may be a contractor that has applied for but not yet assigned an account from the SSO. Ned may be a new employee whose SSO account has not yet been tested to work with the service.

Diane has been assigned native-only, indicating that she is only able to sign-on to the service using the service's native authentication. This may be desirable, for example, if Diane is an outside contractor that does not use any SSO provider.

Sally, Mary and Fred, on the other hand, are only allowed to sign-on the service using the SSO provider. This may, for example, be the "default" setting for all members of the team that (a) are employees, and (b) have had their SSO configurations successfully tested.

While tool 400 illustrates the settings for one team, any given company may establish any number of teams with the service, where the administrator of each team is able to specify the sign-on setting for the members of his/her team. Similarly, the service may support teams from many companies, and individual teams that have members from multiple companies.

Sign-On Process

According to one embodiment, a service that supports both native authentication and third-party single-sign-on authentication initially requests a user to provide only a user-id, such as an email address. If the provided user-id does not match any account at the service, then the user is asked for information to create a new account. For example, the user may be asked to create a password to be used with the new account.

If the user-id does match an account, then the service determines whether or not the user is a single-sign-on user. This may be determined, for example, based on information maintained by the service in association with the user-id. If the user is not a single-sign-on user, then the service proceeds to request, from the user, information required for native authentication. For example, the service may ask the user to enter the user's password.

On the other hand, if the user is a single-sign on user, then the service re-directs the user to the third-party single-sign-on provider. Because the user is redirected without ever having been asked, by the service, to provide a password, the chance of the user providing the user's single-sign-on password to the service is reduced. Once the user has successfully authenticated using the third-party provider, the service will receive the appropriate assertion, and the user will be allowed to access the service.

In an alternative embodiment, the service may initially present the user with an interface for providing both user-id and password. However, as soon as the user-id is entered, and before the password is entered in the interface, a search is performed to verify that the user is not a single-sign-on user. If the user is a single-sign-on user, then the user is redirected before the user submits the user's password to the service. The speed of the search may be improved, for example, by (a) storing hashes of all SSO-user-IDs, (b) applying a hash function to received user-id, and (c) determining whether the resulting hash value matches any of the stored hash values.

In yet another alternative, the service may have an install program that the user executes to create a new account with the service. The install program may be made available for download from the "team" account to which the user will belong. When the install program is downloaded, the service passes to the install program data that indicates whether the install program was downloaded from a team account that was configured to use SSO. When executed, the install program presents an interface that is based on whether the install program was downloaded from a team account configured to use SSO. Specifically, if the install program was not downloaded from an SSO-enabled team account, the install program requests all information (including password) required for the native authentication. On the other hand, if the install program is downloaded from an SSO-enabled eam account, the install program merely request the user-id, and then re-directs the user to the authentication page of the third-party SSO provider.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
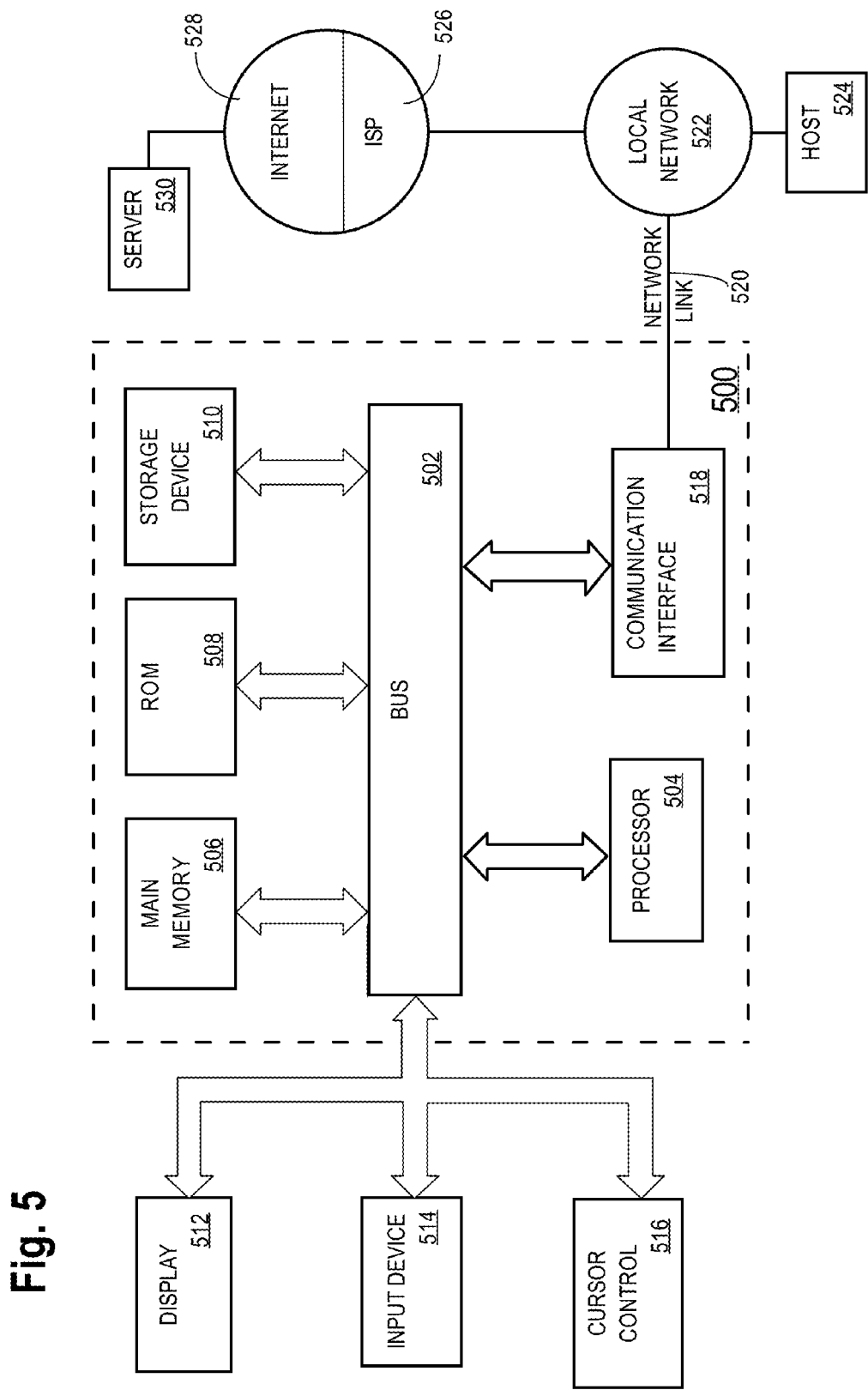
FIG. 5 is a block diagram of a computer system upon which embodiments of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
providing, by a service, a first mechanism by which users of the service may sign on to the service using native authentication of the service;
providing, by the service, a second mechanism by which users of the service may sign on to the service using a third-party single-sign-on provider;
storing, at the service, data that identifies a plurality of teams;
storing, at the service, data that identifies at least one administrator of each of the plurality of teams;
enabling an administrator of each team of the plurality of teams to access and use a tool to specify which sign-on options, of a plurality of sign-on options made available by the service, are assigned to members of the team to which the administrator belongs;
wherein the plurality of sign-on options includes at least a particular sign-on option in which both the first mechanism and the second mechanism may be used; and
wherein the method is performed by one or more computing devices.

2. The method of claim 1, wherein an administrator of a particular team of the plurality of teams uses the tool to specify that the particular sign-on option is assigned to particular members of the particular team; and wherein the method further comprises:
while the particular sign-on option is assigned to the particular members, determining which of the particular members successfully used the second mechanism to sign on to the service.

3. The method of claim 1, wherein an administrator of a particular team of the plurality of teams uses the tool to specify that the particular sign-on option is assigned to particular members of the particular team; and wherein the method further comprises:
while the particular sign-on option is assigned to the particular members, determining which of the particular members unsuccessfully attempted to use the second mechanism to sign on to the service.

4. The method of claim 1, wherein the plurality of sign-on options includes another sign-on option in which only the second mechanism may be used.

5. The method of claim 1, wherein an administrator of a particular team of the plurality of teams uses the tool to specify that the particular sign-on option is assigned to particular members of the particular team, wherein the plurality of sign-on options includes a second sign-on option in which only the second mechanism may be used, and wherein the method further comprises:
   while the particular sign-on option is assigned to the particular members, determining a number of the particular members that successfully used the second mechanism to sign on to the service; and
   based on the number, automatically assigning the second sign-on option, instead of the particular sign-on option, to the particular members of the team.

6. The method of claim 1, wherein an administrator of a particular team of the plurality of teams uses the tool to specify that the particular sign-on option is assigned to a particular member of the particular team, wherein the plurality of sign-on options includes a second sign-on option in which only the second mechanism may be used, and wherein the method further comprises:
   while the particular sign-on option is assigned to the particular member, determining that the particular member successfully used the second mechanism to sign on to the service; and
   automatically assigning the second sign-on option, instead of the particular sign-on option, to the particular member.

7. The method of claim 1, wherein the plurality of sign-on options further includes at least:
   a first sign-on option in which only the first mechanism may be used to sign-on to the service; and
   a second sign-on option in which only the second mechanism may be used to sign-on to the service.

8. The method of claim 1, further comprising:
   determining, for a particular member, a sign-on option, of the plurality of sign-on options, assigned to the particular member, based on a role to which the particular member is assigned;
   wherein a plurality of members, from one or more teams of the plurality of teams, are assigned to the role;
   wherein the particular sign-on option is assigned to the role.

9. The method of claim 1 wherein the tool provides an interface that includes:
   a control for receiving, from the administrator, data that indicates an address of a single-sign-on provider;
   a control for receiving, from the administrator, data required to authenticate a particular member at the single-sign-on provider; and
   a control to initiate a test.

10. The method of claim 9 wherein the interface further comprises an element for indicating whether the test was successful.

11. One or more non-transitory storage media storing instructions which, when executed by one or more computing devices, cause performance of a method comprising the steps of:
   providing, by a service, a first mechanism by which users of the service may sign on to the service using native authentication of the service;
   providing, by the service, a second mechanism by which users of the service may sign on to the service using a third-party single-sign-on provider;
   storing, at the service, data that identifies a plurality of teams;
   storing, at the service, data that identifies at least one administrator of each of the plurality of teams;
   enabling an administrator of each team of the plurality of teams to access and use a tool to specify which sign-on options, of a plurality of sign-on options made available by the service, are assigned to members of the team to which the administrator belongs;
   wherein the plurality of sign-on options includes at least a particular sign-on option in which both the first mechanism and the second mechanism may be used; and
   wherein the method is performed by one or more computing devices.

12. The one or more non-transitory storage media of claim 11, wherein an administrator of a particular team of the plurality of teams uses the tool to specify that the particular sign-on option is assigned to particular members of the particular team; and wherein the method further comprises:
   while the particular sign-on option is assigned to the particular members, determining which of the particular members successfully used the second mechanism to sign on to the service.

13. The one or more non-transitory storage media of claim 11, wherein an administrator of a particular team of the plurality of teams uses the tool to specify that the particular sign-on option is assigned to particular members of the particular team; and wherein the method further comprises:
   while the particular sign-on option is assigned to the particular members, determining which of the particular members unsuccessfully attempted to use the second mechanism to sign on to the service.

14. The one or more non-transitory storage media of claim 11, wherein the plurality of sign-on options includes another sign-on option in which only the second mechanism may be used.

15. The one or more non-transitory storage media of claim 11, wherein an administrator of a particular team of the plurality of teams uses the tool to specify that the particular sign-on option is assigned to particular members of the particular team, wherein the plurality of sign-on options includes a second sign-on option in which only the second mechanism may be used, and wherein the method further comprises:
   while the particular sign-on option is assigned to the particular members, determining a number of the particular members that successfully used the second mechanism to sign on to the service; and
   based on the number, automatically assigning the second sign-on option, instead of the particular sign-on option, to the particular members of the team.

16. The one or more non-transitory storage media of claim 11, wherein an administrator of a particular team of the plurality of teams uses the tool to specify that the particular sign-on option is assigned to a particular member of the particular team, wherein the plurality of sign-on options includes a second sign-on option in which only the second mechanism may be used, and wherein the method further comprises:
   while the particular sign-on option is assigned to the particular member, determining that the particular member successfully used the second mechanism to sign on to the service; and automatically assigning the second sign-on option, instead of the particular sign-on option, to the particular member.

17. The one or more non-transitory storage media of claim 11, wherein the plurality of sign-on options further includes at least:
   a first sign-on option in which only the first mechanism may be used to sign-on to the service; and
   a second sign-on option in which only the second mechanism may be used to sign-on to the service.

18. The one or more non-transitory storage media of claim 11, wherein the method further comprising:
   determining, for a particular member, a sign-on option, of the plurality of sign-on options, assigned to the particular member, based on a role to which the particular member is assigned;
   wherein a plurality of members, from one or more teams of the plurality of teams, are assigned to the role;
   wherein the particular sign-on option is assigned to the role.

19. The one or more non-transitory storage media of claim 11 wherein the tool provides an interface that includes:
   a control for receiving, from the administrator, data that indicates an address of a single-sign-on provider;
   a control for receiving, from the administrator, data required to authenticate a particular member at the single-sign-on provider; and
   a control to initiate a test.

20. The one or more non-transitory storage media of claim 19 wherein the interface further comprises an element for indicating whether the test was successful.

* * * * *